Sept. 15, 1953   W. C. FREEMAN, JR   2,652,518
VARIABLE CAPACITOR TUBE
Filed Nov. 3, 1950

INVENTOR
WALTER C. FREEMAN JR.
BY
ATTORNEY

Patented Sept. 15, 1953

2,652,518

UNITED STATES PATENT OFFICE 2,652,518

VARIABLE CAPACITOR TUBE

Walter C. Freeman, Jr., Morris Plains, N. J., assignor to Sylvania Electric Products Inc., a corporation of Massachusetts Application November 3, 1950, Serial No. 193,850

10 Claims. (Cl. 315—58)

This invention relates to a variable capacitor tube or control device for producing variations in capacity in response to variations of a control voltage.

I am aware that it has been proposed to provide control tubes in which the space current flow causes the heating of a bi-metallic strip, thereby causing the strip to bend more or less, depending on the amount of heat produced, which, in turn, depends on the control or grid voltage applied. The motion of the strip is applied to a variable mica-dielectric capacitor built into the tube and changes its capacity with motion of the strip.

Such tubes employ mechanical linkages between the bi-metallic strip and the variable capacitor. These linkages are troublesome and expensive to produce, control and assemble and may under some circumstances tend to be microphonic.

It is an object of this invention to produce a variable capacitor tube employing no bi-metallic strips, mechanical linkages or other moving parts and in which the variation in capacity is obtained by the electronic action of the tube directly on the dielectric of the capacitor.

It is a further object of this invention to provide such a tube which is relatively free from microphonism and which is relatively inexpensive to produce, control and assemble.

Still other objects and advantages of my invention will be apparent from the specification.

Figure 1:
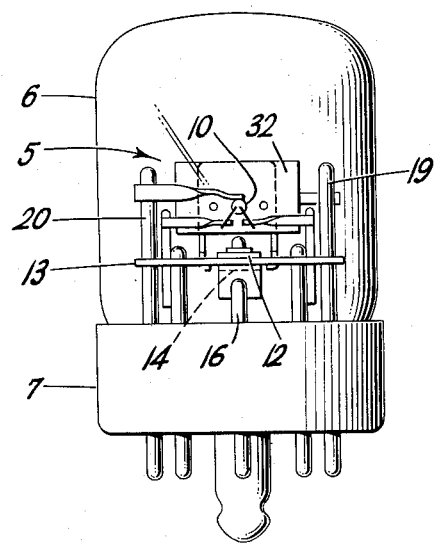
Figure 2:
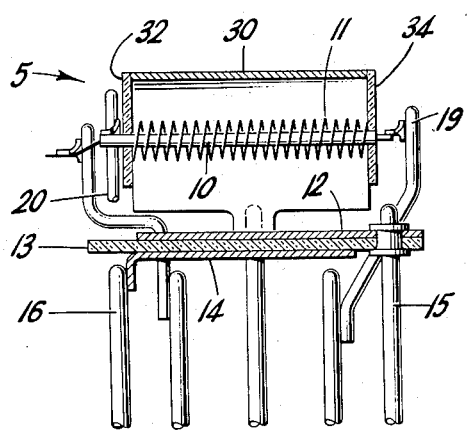
Figure 3:
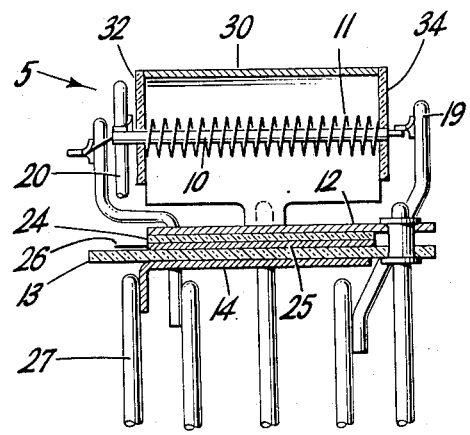

The features of novelty which I believe to be characteristic of my invention are set forth with particularity in the appended claims. My invention itself, however, will best be understood by reference to the specification and accompanying drawing in which:

Figure 1 is a view in elevation of a tube in accordance with my invention, while Figure 2 is a sectional view of the mount of the tube of Figure 1 to clarify the construction and arrangement of the electrodes and other elements of the tube, and Figure 3 is a similar view of a modified form of my invention.

In accordance with this invention, the variation in capacity within the tube is obtained by employing a built-in capacitor having a dielectric of such nature that changes in temperature of the dielectric cause changes in the capacity of the capacitor. The capacitor dielectric is so positioned and arranged as to receive heat from the anode of the tube, so that it varies in temperature with the amount of space current flowing in the tube.

Referring now more particularly to the drawing, Figure 1 illustrates a capacitor control tube of the invention having an electrode mount structure 5 within an evacuated envelope 6. A conventional plug in base 7 is provided for connecting the tube to its destined circuit. The mount 5 is separately shown in Figure 2 and includes a cathode 10 of the usual indirectly heated type, the heater being omitted from the drawing for purposes of simplicity. Surrounding the cathode 10 there is preferably a grid or control electrode 11 which may be of usual construction. A screen grid, adapted to be connected to a suitable source of potential may be included. Anode 12 is provided in position to receive electrons from the cathode and is maintained at a positive potential thereto by a battery or other power supply connected thereto and grounded or otherwise returned to cathode, which may also be grounded.

The dielectric material 13 may be positioned in contact with the anode so as to receive heat from it and also so that the anode acts as one plate of the capacitor, the other plate of which may be metallic plate 14, in contact with the opposite side of the dielectric. The dielectric should be a material having a high temperature coefficient of dielectric constant such as the ceramic materials composed of alkaline earth titanates as for example, strontium titanate.

The control voltage may be applied between terminal pins 19 and 20 connected to grid and cathode respectively, and the variable capacity appears across terminals 15 and 16 connected to the anode 12 and the other plate 14 of the capacitor respectively. The side of the mount remote from anode 12 is surrounded by a shield 30 which is adapted to be grounded and the various electrodes are secured in position by being attached to mica spacers 32, 34 at each end of the mount.

Referring now to Figure 3 in case it is desired not to have the anode 12 form one plate of the variable capacitor, insulating plate 24, which may be a thin sheet of mica, may be provided adjacent anode 12 and against this is secured condenser plate 25 and then, in order, dielectric 13 and the other condenser plate 14. The mica is provided to permit good thermal contact between the dielectric and anode 12 while insulating the anode from the first condenser plate 25.

In this form of the invention the variable capacity appears across leads 26 and 27 connected to the two plates of the capacitor respectively.

As will be understood, in both forms of the invention, the space current flowing within the tube is controlled by the impressed control or grid voltage, the temperature of the anode increases with increase in space current and the temperature of the dielectric increases with increased anode temperature, causing a change in the capacity of the condenser of which the dielectric is part.

In this specification I have explained the principles of my invention and the best mode in which I have contemplated applying those principles so as to distinguish my invention from other inventions, and I have particularly pointed out and distinctly claimed the part, improvement or combination which I claim as my invention.

While I have shown and described certain preferred embodiments of my invention, it will be apparent that modifications and changes may be made without departing from the spirit and scope thereof as will be clear to those skilled in the art.

What I claim is:

1. An electrical control device comprising an envelope, cathode, anode and control electrodes within said envelope, and a variable capacitor within said envelope, said capacitor having a dielectric having a relatively high temperature coefficient of dielectric constant, said dielectric being positioned in thermally conductive relation to said anode so as to be heated thereby.

2. An electrical control device comprising an envelope, cathode, anode and control electrodes within said envelope, and a variable capacitor positioned within said envelope, said capacitor having a dielectric having a relatively high temperature coefficient of dielectric constant, said anode being in contact with said dielectric and forming one plate of said variable capacitor.

3. An electrical control device comprising an envelope, cathode, anode and control electrodes within said envelope, and a variable capacitor positioned within said envelope, said capacitor having a dielectric having a relatively high temperature coefficient of dielectric constant and having a pair of plates on opposite sides of said dielectric, both said plates being electrically insulated from said anode, and said dielectric being positioned in thermally conductive relation to said anode so as to be heated thereby.

4. An electrical control device comprising an envelope, cathode, control and anode electrodes positioned within said envelope, and a variable capacitor positioned within said envelope, said capacitor having a pair of conducting plates separated by a dielectric having a relatively high temperature coefficient of dielectric constant, one of said plates constituting said anode.

5. An electrical control device comprising an envelope, cathode, anode and control electrodes within said envelope, and a variable capacitor within said envelope, the dielectric of said capacitor having a relatively high temperature coefficient of dielectric constant and being formed of materials containing a single alkaline earth titanate, said dielectric being positioned in thermally conductive relation to said anode so as to be heated thereby.

6. An electrical control device comprising an envelope, cathode, anode and control electrodes within said envelope, and a variable capacitor within said envelope, the dielectric of said capacitor having a relatively high temperature coefficient of dielectric constant and consisting principally of an alkaline earth titanate, said dielectric being positioned in thermally conductive relation to said anode so as to be heated thereby.

7. The method of controlling the capacity of a variable capacitor which comprises heating the dielectric of said capacitor by heat produced by a space discharge current, and controlling the amount of said heating by controlling the magnitude of said space discharge current.

8. The method of controlling the capacity of a variable capacitor which comprises heating the dielectric of said capacitor by heat produced by a space discharge current, and controlling the magnitude of said space discharge current by an electric field in the path of said space discharge current.

9. A new article of manufacture consisting of a vacuum tube having an envelope containing a cathode, an anode, and a control electrode, and a variable capacitor having a dielectric having a relatively high temperature coefficient of dielectric constant positioned within said envelope adjacent said anode so as to be heated thereby.

10. An electrical control device comprising an envelope, cathode, anode and control electrodes within said envelope, and a variable capacitor positioned within said envelope, said capacitor having a dielectric with a relatively high temperature coefficient of dielectric constant and having a pair of plates on opposite sides of said dielectric, said dielectric being positioned to be heated by the space discharge current between said cathode and anode.

WALTER C. FREEMAN, JR.

References Cited in the file of this patent

UNITED STATES PATENTS

| Number | Name | Date |
|---|---|---|
| 2,470,893 | Hepp | May 24, 1949 |
| 2,502,549 | Anthony et al. | Apr. 4, 1950 |
| 2,528,113 | Carlson et al. | Oct. 31, 1950 |
| 2,554,877 | O'Neill et al. | May 29, 1951 |

FOREIGN PATENTS

| Number | Country | Date |
|---|---|---|
| 631,044 | Great Britain | Oct. 26, 1949 |